Patented Nov. 13, 1951

2,574,459

UNITED STATES PATENT OFFICE 2,574,459

PREPARATION OF BROWN OXIDE OF IRON

Leonard M. Bennetch, Bethlehem, Pa., assignor to Reichard-Coulston, Inc., Bethlehem, Pa., a corporation of New York No Drawing. Application August 12, 1947, Serial No. 768,277

4 Claims. (Cl. 106—304)

As conducive to a clear understanding of the invention, it is noted that where it is attempted to produce brown oxide of iron pigment by mechanical blending or particles of iron oxide of various colors such as black, yellow and red, not only would the operation be delicate and relatively costly, but the pigment would be objectionable due to separation of stratification of various color components, a defect known as streaking, floating or flooding. Were the brown oxide produced by the physical or chemical treatment of iron compounds, such as by low temperature calcination of black oxide or by temperature controlled oxidation of precipitated ferrous hydroxide, only a limited number of shades would thus be readily obtainable, and accordingly careful blending with iron oxide of various colors such as black, yellow, red or other shade of brown, would be necessary where other shades are required, and this would entail enhanced cost and the likelihood of streaking, floating or flooding.

It is accordingly among the objects of the present invention to provide a process which involves simple equipment and inexpensive raw materials, but yields brown oxide of iron pigment in any of an almost infinite variety of predetermined shades without the need for blending, of rich mass tone or high tinctorial value, as preferred, and of complete stability of such pigment without the slightest danger of streaking, floating or flooding.

According to the invention from its broadest aspect, the pigment is composed of chemically constituted individual brown particles produced by precipitating or occluding or otherwise incorporating with hydrous iron oxide nucleus of one selected color, sufficient hydrous iron oxide of a different color to produce unitary particles of the desired shade of brown. The process as thus generally characterized may be carried out according to either of two methods.

In one method the nucleus is of larger than colloidal size and of predetermined shade of red hydrous ferric oxide and the precise shade of brown oxide desired is attained by precipitating on such nucleus an appropriately controlled proportion of hydrous ferrous oxide. For a light shade of brown, the precipitate upon the nucleus may be as little as 5 per cent or less of the weight of the composite pigment, while for a dark or deep shade of brown the precipitate may be as much as 20 per cent or more by weight of the total pigment.

In a second process, the shade of brown is determined by selection of the nucleus of black, yellow, red or brown oxide upon which the precipitate of hydrous iron oxide is effected. While in this process the nucleus selected would ordinarily be of colloidal character and its color would determine the character of the pigment, nucleus particles larger than colloidal could be used for greater richness of mass but less tinctorial properties. For yellow toned browns the nucleus might be black oxide of iron; for olive drab shades of brown the nucleus might be yellow oxide or iron and for red toned browns it might be red or brown oxide of iron.

While the process in each embodiment, from its broadest aspect resides in the combination generally, its practical efficacy depends upon the utilization of particular nuclear particles produced in particular manner, in combination with particular methods of effecting the precipitation thereon or incorporation therewith of the iron oxide.

According to a preferred process, a nucleus of red oxide of iron is prepared by starting with a colloidal suspension of hydrous ferric oxide which may be prepared from ferrous salt, preferably copperas, and alkali, preferably sodium hydroxide in slight excess beyond combining proportions in aqueous solution under atmospheric pressure, the slurry being subjected to oxidation, preferably by blowing air therethrough at room temperature. After removal of excess alkali by adding ferrous salt such as copperas and blowing more air therethrough, the reddish hydrous ferric oxide will exist in colloidal form.

To the slurry bearing in suspension therein the seed particles of hydrous ferric oxide, there is thereupon added metallic iron, preferably in the form of mild steel scrap, together with further copperas, while maintaining the bath in the range preferably of 70 to 80 degrees C. and blowing air therethrough to effect oxidation. The oxidized iron becomes incorporated with the seed particles by deposit thereon, occlusion thereby or otherwise, until these grow to the pigment size and shade of red desired for the nucleus. As the oxidation proceeds, that color changes from reddish brown first to light yellowish red and finally to deeper and deeper shades of red. Three days of the oxidation treatment leads to a medium shade of red.

The brown oxide is rapidly produced from the nucleus set forth without further oxidation or long processing. The ferrous oxide is precipitated upon and incorporated with the nucleus prepared as set forth, conveniently, though not necessarily, in a tank separate from that in which the nucleus particles are prepared. To this end the slurry of nucleus particles is desirably first analyzed to determine just what quantity of ferrous salt must be added to produce the desired percentage of ferrous oxide to be precipitated in order to attain the shade of brown to be produced. The percentage of mass of the precipitated ferrous oxide as compared to that of the finished brown pigment is from less than 5 per cent to approximately 30 per cent, the shade of brown becoming darker as said percentage is increased. For most applications, that percentage will be between 5 and 20. Desirably copperas is used to produce this precipitate together with a slight excess of alkali, preferably sodium hydroxide, and the treatment is conducted at boiling temperature maintained for a few hours to ensure completion of the reaction.

Where light yellowish red hydrous ferric oxide, prepared as above set forth, is employed as the nucleus, as little as 5 per cent of the mass of the final pigment would be precipitated as ferrous oxide, which results in a light brown pigment of small particle size and of correspondingly high tinctorial value. Where the nucleus has been grown to size such as to present a deep red hydrous ferric oxide, the ferrous hydroxide precipitate thereon may be in the order of 20 per cent of the mass of the final pigment which results in a medium to deep tone of reddish brown of correspondingly larger size of pigment particle and therefore of richer mass tone. By use of lesser or greater or intermediate proportions of ferrous oxide precipitate than the examples given, corresponding variations in the shade of brown of the resultant pigment are attained.

In one specific example according to the process set forth for producing a medium shade of red toned brown oxide of iron, a nucleus of medium red hydrous ferric oxide is prepared as above set forth, whereupon the oxidation is stopped. The slurry bearing the nucleus is pumped into a brown pigment production vat in which the slurry is slowly agitated by an appropriate stirrer and heated, as for instance by steam coils. After calculating the amount of copperas required to yield a product of which the nucleus is approximately 90 per cent and the added ferrous oxide precipitate about 10 per cent the weight of the required particle, said amount of copperas is added together with sodium hydroxide in amount slightly in excess of combining proportions and the mass is raised to the boiling point and the boiling point is maintained for some hours while continuing the stirring to complete the combination. All of the copperas is thus precipitated as ferrous hydroxide which combines rapidly with the hydrous ferric oxide nucleus to form a stable high quality brown oxide of the desired medium shade of red toned brown.

While the latter reaction could be carried on at temperature below boiling, the process would take longer, while the use of higher temperature and pressure is less preferred since it would require more elaborate equipment.

After completion of the process, the slurry is filtered to remove the pigment which is then washed, dried and disintegrated, all of which operations are easily performed.

The process above described has the great advantage of economy in cost, since a large percentage of the product, as much as 70 per cent, is prepared by the oxidation of iron scrap, rather than by use of more costly precipitation by alkali. Moreover, the nucleus particles are formed rapidly and the combination of the precipitated ferrous oxide therewith to form the brown pigment is a fast reaction, so that the output per gallon of tankage is high and the need for long processing is obviated. Moreover, particularly attractive shades of brown are readily produced by this procedure.

According to a second process, the nucleus is a colloidal or very finely divided iron oxide such as used as the first step of preparing the nucleus in the previously described process. The said nucleus is heated in aqueous alkaline slurry under oxidizing conditions, preferably by bubbling an excess of air therethrough, while continuously adding solutions of iron salt and alkali in substantially combining proportions with resultant precipitation of ferrous oxide upon or for incorporation with the nucleus and the consequent growth thereof to larger particles. The degree of oxidation of the precipitating iron oxide effected in this procedure causes the brown color to develop in the growing nucleus. The duration of the process, that is the length of time during which iron salt and alkali are added, determines the particle size and shade of the resultant brown pigment. Where the period of growth and oxidation is short, the color is dark and the particles fine for good tinctorial value. As the period of growth is prolonged, the shade becomes lighter and the particle size larger for richer mass tone.

The chemical and physical properties of the initial seed determine the color characteristics of the resulting brown oxide of iron pigment. The color may also be modified by controlling the degree of oxidation of the precipitated ferrous oxide, the less the oxidation, the darker the product.

A colloidal black oxide nucleus will yield a range of yellow toned brown pigments; a grayish black nucleus will yield a medium yellowish brown pigment; yellow oxide nucleus an olive drab brown pigment and red or brown oxide nucleus a red toned brown pigment. The desired color may be readily predetermined by production control, as above indicated, in the formation of the nuclear particles and in the precipitation and oxidation of the ferrous oxide for incorporation therewith.

It will be understood that if desired the nucleus particles in this procedure may be larger than colloidal, so that the final pigment will be of coarser particles which will be richer in mass tone but weaker tinctorially.

In one typical example for the production of a medium yellowish brown pigment, 600 pounds of copperas ($FeSO_4 \cdot 7H_2O$) is dissolved in a wooden tank in water at 80 degrees F. to make 380 gallons. 1.6 pounds of sodium hydroxide per gallon of water is then dissolved in a separate tank. 110 gallons of the sodium hydroxide solution is pumped into the copperas solution. A slow speed agitator is then started and heat is applied, preferably through steam pipes, while air is introduced through aeration pipes at the bottom of the tank. While not vital to operativeness, it is found practicable to take 25 minutes for pumping the sodium hydroxide into the copperas solution, to raise the temperature at the rate of about 1 degree F. per minute and to introduce the air at the rate of about 13 cubic feet per minute. In about two hours the temperature will have reached 200 degrees F. and a colloidal gray black iron oxide seed will have formed, suspended in the slurry.

While continuing gentle agitation and aeration there are added ferrous salt such as copperas and alkali such as sodium hydroxide. These compounds are added in substantially combining proportions thereof with slight excess of sodium hydroxide, accuracy of proportioning being assured by use of automatic feeders. Control is maintained by keeping the pH of the slurry above 10. This process is continued for about 48 hours until about 325 pounds of sodium hydroxide and 1000 pounds of copperas, that is, 1.6 pounds per gallon of sodium hydroxide to 3.4 pounds per gallon of copperas have been added as precipitants. As a result of the operation set forth, the colloidal nucleus grows to the required size, and the yield is 500 pounds of pigment of the corresponding desired medium yellowish brown shade. Separation by filtering, washing, drying and disintegration is performed as in the process first described.

Where the use of the colloidal gray black nucleus given in the above example yields a medium yellowish brown shade of pigment, the use of a black oxide or magnetite nucleus would yield a darker yellow tone brown, of yellow oxide nucleus an olive drab brown, and of red or brown oxide nucleus a red toned brown, and that in each case, while the colloidal size of nucleus is ordinarily preferred, the use of a larger nucleus will lead to a corresponding shade of brown, which while of richer mass tone has less tinctorial properties.

All subject-matter herein disclosed generic to red oxide of iron is the subject-matter of my co-pending application, Serial No. 749,861, filed May 22, 1947.

As many changes could be made in the above process and product, and many apparently widely different embodiments of this invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. The process of manufacturing brown oxide of iron pigments, which comprises forming a slurry of red hydrous ferric oxide nuclei by treating an aqueous slurry of ferrous salt with an excess of alkali under oxidizing conditions to form a slurry of colloidal particles of hydrous ferric oxide nuclei, adding a ferrous salt to the resultant slurry to react with the unreacted alkali while subjecting the resultant reaction mixture to oxidation, thereafter adding metallic iron scrap to the resultant slurry while subjecting it to oxidizing conditions until a slurry of red hydrous ferric oxide of desired particle size and shade is obtained, and precipitating on the red hydrous ferric oxide particles of said slurry from 5% to 30% by weight, based on the weight of the pigments, of ferrous oxide produced by reacting a ferrous salt with small excess of alkali in the presence of said slurry and in the absence of oxidizing agent, thus producing the desired brown oxide of iron pigments.

2. The process as defined in claim 1, in which the precepitation of the ferrous oxide on the red hydrous ferric oxide nuclei particles is carried out at the boiling temperature of the mixture of the slurry of red hydrous ferric oxide, the ferrous salt and alkali.

3. The process of claim 1 in which the weight of ferrous oxide deposited on the ferric oxide nuclei is from 5% to 20% by weight based on the weight of the pigments.

4. The process of manufacturing brown oxide of iron pigments, which comprises reacting copperas with a small excess of alkali over the stoichiometric amount required for combination with the copperas, in an aqueous medium while blowing air therethrough, adding additional copperas to the reaction mixture while continuing the blowing of air therethrough until there results a slurry of reddish hydrous ferric oxide particles in the aqueous medium, adding to this slurry metallic iron while blowing air therethrough and maintaining the reaction mixture at a temperature of 70° to 80° C. until the desired particle size and shade of red hydrous ferric oxide particles has been attained in said slurry and precipitating on the red hydrous ferric oxide particles of said slurry from 5% to 20% by weight, based on the weight of the pigments, of ferrous oxide produced by reacting copperas with small excess of alkali at the boiling temperature of the resultant reaction mixture in the absence of oxidizing agent, thus producing the desired brown oxide of iron pigments.

LEONARD M. BENNETCH.

REFERENCES CITED

The following references are of record in the file of this patent:

UNITED STATES PATENTS

| Number | Name | Date |
| --- | --- | --- |
| 1,368,748 | Penniman et al. | Feb. 15, 1921 |
| 1,726,851 | McLeod | Sept. 3, 1929 |
| 2,127,907 | Fireman | Aug. 23, 1938 |
| 2,388,659 | Ryan et al. | Nov. 6, 1945 |